United States Patent [19]
Miwa et al.

[11] Patent Number: 5,983,330
[45] Date of Patent: Nov. 9, 1999

[54] MICROCOMPUTER WITH WATCHDOG TIMER SETTINGS SUPPRESSING INTERRUPT REQUEST PROCESSING OVER MEMORY DATA WRITE OPERATION TO FLASH MEMORY

[75] Inventors: Yuichiro Miwa; Katsunobu Hongo, both of Tokyo, Japan

[73] Assignee: Mitsubishi Denki Kabushiki Kaisha, Tokyo, Japan

[21] Appl. No.: 08/917,189

[22] Filed: Aug. 25, 1997

[30] Foreign Application Priority Data

Mar. 21, 1997 [JP] Japan ................................. 9-068835

[51] Int. Cl.[6] .................................................. G06F 12/08
[52] U.S. Cl. ......................... 711/167; 711/103; 711/168; 710/262; 714/30
[58] Field of Search ..................................... 711/167, 168, 711/103, 100; 710/48–49, 244, 260, 262, 264; 714/22, 30, 34

[56] References Cited

U.S. PATENT DOCUMENTS

| | | | |
|---|---|---|---|
| 4,382,279 | 5/1983 | Ugon . | |
| 5,226,151 | 7/1993 | Takida et al. ....................... | 395/182.03 |
| 5,408,643 | 4/1995 | Katayose ............................. | 395/185.08 |
| 5,440,603 | 8/1995 | Sugita ......................................... | 377/20 |
| 5,541,943 | 7/1996 | Niescier et al. ......................... | 714/815 |
| 5,594,865 | 1/1997 | Saitoh ....................................... | 714/55 |
| 5,619,704 | 4/1997 | Yagi et al. ............................... | 710/262 |
| 5,864,663 | 1/1999 | Stolan ................................. | 395/185.08 |
| 5,881,295 | 3/1999 | Iwata ...................................... | 711/103 |

FOREIGN PATENT DOCUMENTS

| 63-54642 | 3/1988 | Japan . |
|---|---|---|
| 7-168741 | 7/1995 | Japan . |

*Primary Examiner*—John W. Cabeca
*Assistant Examiner*—Pierre-Michel Bataille
*Attorney, Agent, or Firm*—Burns, Doane, Swecker & Mathis, LLP

[57] ABSTRACT

A microcomputer capable of solving a problem in that the load of software is heavy for setting a watchdog timer in a conventional microcomputer. It includes a switching circuit which supplies a central processing unit with the output of the watchdog timer as an interrupt signal unless a memory data write mode for writing data to a memory is not designated from the outside of the microcomputer, and which inhibits an overflow signal of the watchdog timer from being supplied to the central processing unit when the memory data write mode is designated from the outside of the microcomputer.

8 Claims, 9 Drawing Sheets

FIG.3(a) DATA ON BUS 490

FIG.3(b) WRITE PULSE WP

FIG.3(c) DATA LATCH OF FLASH MEMORY CONTROLLER 430

FIG.3(d) BUSY SIGNAL BSY

FIG.3(e) WRITE COMPLETION SIGNAL WC

1

MICROCOMPUTER WITH WATCHDOG TIMER SETTINGS SUPPRESSING INTERRUPT REQUEST PROCESSING OVER MEMORY DATA WRITE OPERATION TO FLASH MEMORY

BACKGROUND OF THE INVENTION

1. Field of the Invention

The present invention relates to a microcomputer embedding an electrically erasable, CPU writable flash memory.

2. Description of Related Art

FIG. 8 is a block diagram showing a configuration of a conventional microcomputer. In this figure, the reference numeral 100 designates a microcomputer, 200 designates a personal computer for transferring programs to the microcomputer 100, and 300 designates an interface circuit for connecting the microcomputer 100 with the personal computer 200. The microcomputer 100 includes a central processing unit (called CPU from now on) 110 for controlling the microcomputer 100 in its entirety, a flash memory 120 for storing programs and the like, a flash memory controller 130 for controlling reading and writing of the flash memory 120, a clock generator 140 for generating internal clock signals of the microcomputer 100, a watchdog timer 150 for detecting runaway of the microcomputer 100, peripheral circuits 160 such as A/D converters or a timer, an interrupt controller 170 for controlling priority of interrupts and the like, and a RAM 180 for temporarily storing the data. The internal circuits of the microcomputer 100 are electrically interconnected by a bus 190. Outside the microcomputer 100, there is connected an oscillator 141 for generating a fundamental oscillation signal of the clock generator 140.

The flash memory controller 130 includes a write/erasing controller 131 for controlling writing and erasing of the flash memory 120, a control register 132 for storing data used for controlling the flash memory, and a command register 133 for storing commands transferred from the CPU to instruct writing/erasing.

Next, the operation will be described.

The clock generator 140 supplies the CPU 110, watchdog timer 150 and peripheral circuits 160 with clock signals CL1, CL2 and CL3, respectively, on the basis of the oscillation frequency of the oscillator 141. The CPU 110 controls the peripheral circuits 160 and others in accordance with the programs stored in the flash memory 120. The watchdog timer 150 always counts the clock signal CL2 generated by the clock generator 140, and outputs an overflow signal OF at every fixed interval T1. Normally, since the CPU 110 sets the watchdog timer 150 at intervals shorter than the fixed interval T1, the overflow signal OF is not output. On the contrary, if the CPU 110 does not set the watchdog timer 150 within an interval shorter than the fixed interval T1 because of an abnormal operation of the CPU 110 or the like, the interrupt controller 170 carries out the interrupt priority processing so that an interrupt signal INT is sent to the CPU 110 to cause an interrupt to the CPU 110, and the CPU 110 executes an abnormal processing program.

Next, the operation of writing data, which is transferred from the personal computer 200, to the flash memory 120 in the microcomputer 100 will be described. The flash memory 120 stores a program for writing the externally supplied data into the flash memory 120 itself. FIG. 9 is a flowchart illustrating the operation of the CPU 110 in the write operation.

When the CPU 110 is started in a CPU rewrite mode set by external dip switches or the like, the CPU 110 transfers a data rewrite program stored in the flash memory 120 to the RAM 180 at step ST901 so that the CPU 110 operates in accordance with the program transferred to the RAM 180. Next, the CPU 110 designates the CPU rewrite mode at step ST902 by writing "1" into a bit in the control register 132, which bit specifies the CPU rewrite mode. Then, the CPU rewrite mode specifying signal M from the control register 132 is fed to the write/erasing controller 131. This causes the write/erasing controller 131 to wait for a command to be written into the command register 133 by the CPU 110 to execute it.

When the CPU 110 writes the write command into the command register 133, the write/erasing controller 131 decodes the command, and identifies that it is the write command into the flash memory 120. Subsequently, the CPU 110 receives the data to be written into the flash memory 120 from the personal computer 200 through the interface circuit 300, and transfers the data to the flash memory 120 at step ST903. The write/erasing controller 131 generates a write pulse WP to carry out writing of the data into the flash memory 120. The writing is implemented when the write pulse WP is "1" which is turned off to "0" when the writing has been completed. Erasing of the data can be implemented by generating similar pulses.

The CPU 110 reads through the control register 132 the busy signal BSY indicating that the write processing is in progress at step ST504, and when the busy signal falls to "0" at step ST905, it checks at step ST906 whether the data are written correctly into the flash memory 120 or not. If it is found at step ST907 as a result of the check that the data transfer includes some error, the CPU 110 retransmits the same data at step ST908. On the contrary, if it is decided at step ST907 that the data transfer has been completed correctly, the CPU 110 sets watchdog timer 150 at step ST909, and checks at step ST910 whether an intended amount of data has been written. If it has been written, the CPU 110 clears the CPU rewrite mode at step ST911, and completes the operation.

The erasure of the flash memory 120 can also be implemented in a manner similar to the write operation described above by writing "1" into a bit in the control register 132, which indicates the CPU rewrite mode, and then by writing the erasing command in the command register 133.

In the conventional microcomputer there are following problems: First, since a time period taken by the write/erasing operation is usually longer than a normal microcomputer operation time, the watchdog timer 150 often overflows during the write/erasing operation, which causes an abnormal interrupt. Second, the software is overloaded to carry out time management for setting the watchdog timer 150 so that the watchdog timer 150 does not overflow even if the write/erasing operation takes a long time.

Thus, the conventional microcomputer including a flash memory has a problem in that the software is overloaded when the CPU controls the set of the watchdog timer 150.

SUMMARY OF THE INVENTION

The present invention is implemented to solve the foregoing problem. It is therefore an object of the present invention to provide a microcomputer capable of setting the watchdog timer appropriately without overloading the software.

According to one aspect of the present invention, there is provided a microcomputer including a central processing unit for executing a predetermined program, the microcomputer comprising: a memory for storing the predetermined program; a watchdog timer for counting a clock signal, and outputting at least one of an overflow signal and an underflow signal when a predetermined time period has elapsed; a memory controller for controlling write operation of the memory; and watchdog timer interrupt suppressing means for suppressing an interrupt due to the watchdog timer while a memory data write mode is designated to the microcomputer from an outside, the memory data write mode being a mode in which data is written into the memory.

Here, the watchdog timer interrupt suppressing means may comprise a switching circuit for supplying the central processing unit with an output signal of the watchdog timer as an interrupt signal except during the memory data write mode, and for inhibiting the overflow signal and the underflow signal of the watchdog timer from being supplied to the central processing unit during the memory data write mode.

The memory controller may output a write completion signal each time a write processing of the memory has been completed, and the switching circuit may supply the central processing unit with the write completion signal as an interrupt signal during the memory data write mode.

The watchdog timer interrupt suppressing means may comprise a watchdog timer set signal generator for supplying the watchdog timer with a watchdog timer set signal which sets the watchdog timer to suspend its counting when the write operation of the memory is started, and which causes the watchdog timer to restart its counting when the write operation has been completed.

The watchdog timer interrupt suppressing means may comprise a watchdog timer set signal generator for supplying the watchdog timer with a watchdog timer set signal which sets the watchdog timer to suspend its counting for a predetermined time period when the write operation of the memory is started, and which causes the watchdog timer to restart its counting after the predetermined time period.

The memory may comprise a flash memory, and the memory controller may control writing to the flash memory.

DETAILED DESCRIPTION OF THE PREFERRED EMBODIMENTS

The invention will now be described with reference to the accompanying drawings.
Embodiment 1

Figure 1:
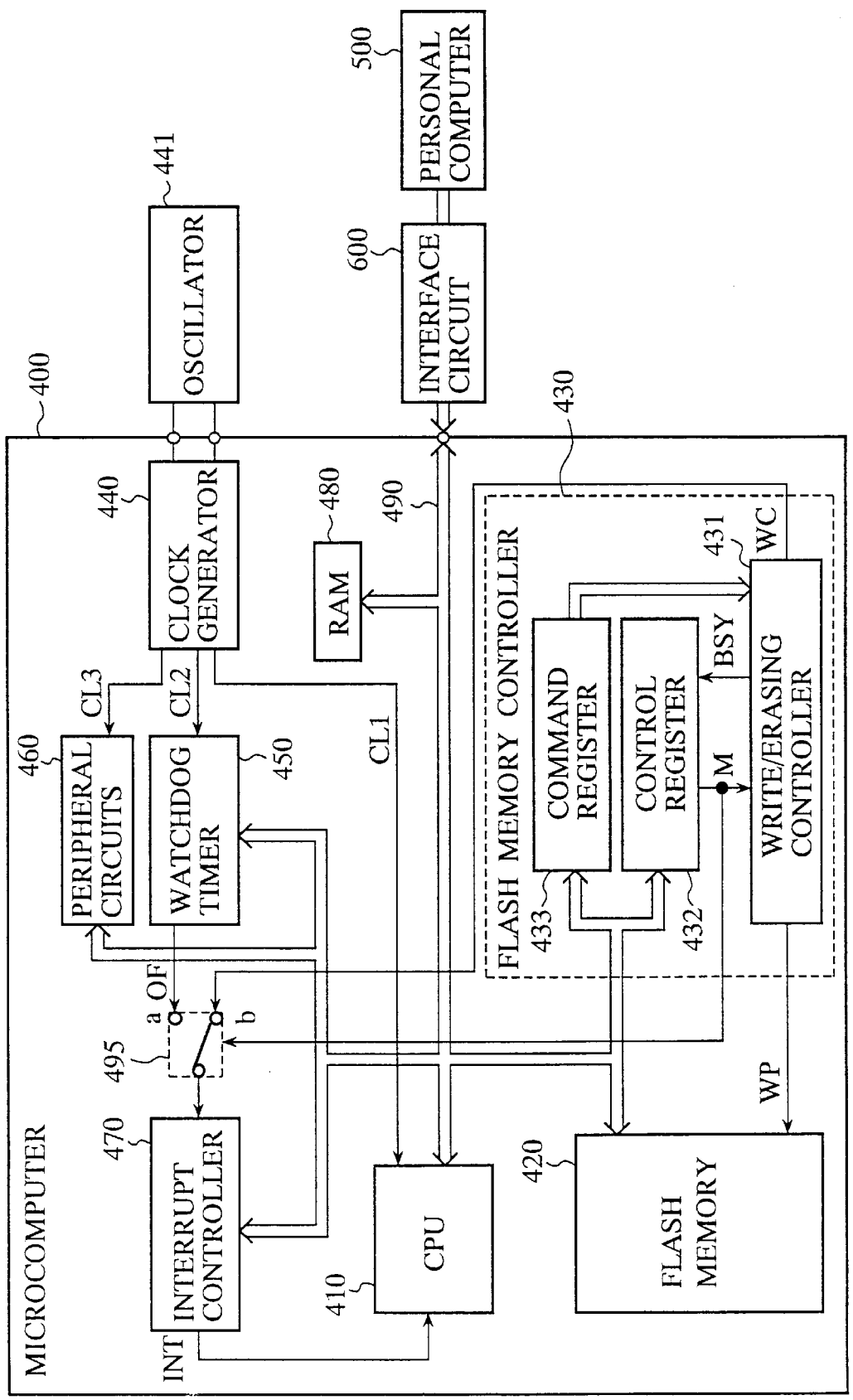
FIG. 1 is a block diagram showing an embodiment 1 of a microcomputer in accordance with the present invention.

FIG. 1 is a block diagram showing an embodiment 1 of a microcomputer in accordance with the present invention. In this figure, the reference numeral 400 designates a microcomputer, 500 designates a personal computer for transferring programs to the microcomputer 400, and 600 designates an interface circuit 600 for connecting the microcomputer 400 with the personal computer 500. The microcomputer 400 includes a central processing unit (called CPU from now on) 410 for controlling the microcomputer 400 in its entirety, a flash memory (memory) 420 for storing programs and the like, a flash memory controller (memory controller) 430 for controlling reading and writing of the flash memory 420, a clock generator 440 for generating internal clock signals of the microcomputer 400, a watchdog timer 450 for detecting runaway of the microcomputer 400, peripheral circuits 460 such as A/D converters or a timer, an interrupt controller 470 for controlling priority of the interrupt and the like, a RAM 480 for temporarily storing data, and a switch 495 for selectively outputting one of its input signals in response to the signal level of a CPU rewrite mode signal M output from the flash memory controller 430.

The flash memory controller 430 includes a write/erasing controller 431 of the flash memory 420, a control register 432 for storing data for controlling the flash memory, and a command register 433 for storing commands for specifying writing or erasing transferred from the CPU 410. The write/erasing controller 431 further outputs a write completion signal WC when the writing operation has been completed. The write completion signal WC is fed to an input port b of the switching circuit 495. The internal circuits of the microcomputer 400 are electrically interconnected by a bus 490 for transferring data or the like. Outside the microcomputer 400, there is connected an oscillator 441 for generating a fundamental oscillation signal of the clock generator 440.

Next, the operation will be described.

The clock generator 440 supplies the CPU 410, watchdog timer 450 and peripheral circuits 460 with clock signals CL1, CL2 and CL3, respectively, on the basis of the oscillation frequency of the oscillator 441. The CPU 410 controls the peripheral circuits 460 and others in accordance with the program stored in the flash memory 420. The watchdog timer 450 always counts the clock signal CL2 generated by the clock generator 440, and outputs an overflow signal OF at every fixed interval T1. In a non-rewrite mode of the CPU, that is, when the CPU rewrite mode signal M is "0", the overflow signal OF output from the watchdog timer 450 is delivered to the interrupt controller 470 through the input port a of the switching circuit 495.

Normally, since the CPU 410 sets the watchdog timer 450 at intervals shorter than the fixed interval T1, the overflow signal OF is not output. On the contrary, if the CPU 410 does not set the watchdog timer 450 within an interval shorter than the fixed interval T1 because of an abnormal operation of the CPU 410 or the like, the interrupt controller 470 carries out the interrupt priority processing, so that an interrupt signal INT is sent to the CPU 410 to cause an interrupt to the CPU 410, and the CPU 410 executes an abnormal processing program. The watchdog timer 450 may output an underflow signal when the watchdog timer 450 underflows.

Figure 2:
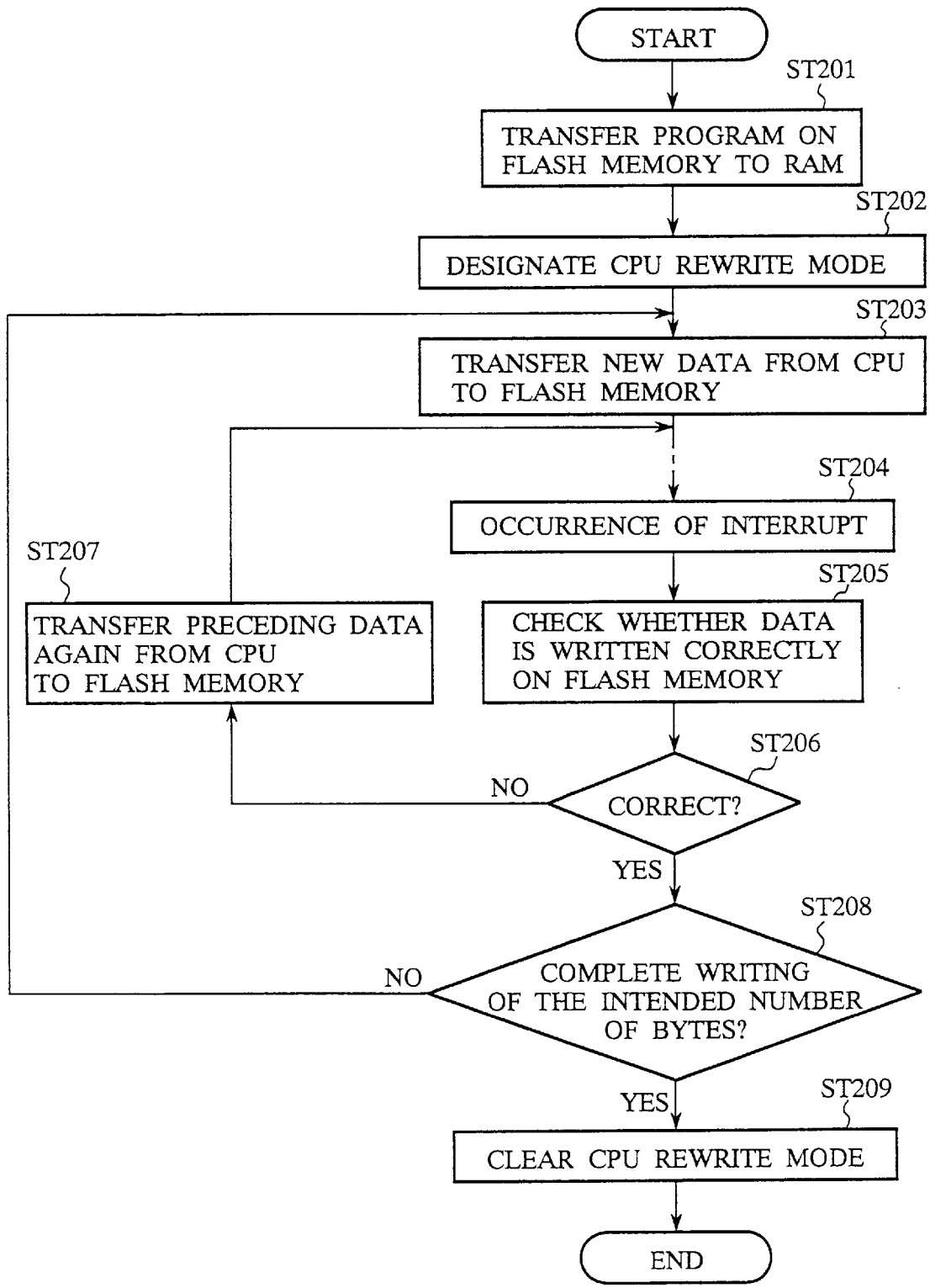
FIG. 2 is a flowchart illustrating the operation of the CPU of the embodiment 1.

Next, the operation of writing data, which are transferred from the personal computer 500, to the flash memory 420 in the microcomputer 400 will be described. The flash memory 420 stores a program for writing the externally supplied data into the flash memory 420 itself. FIG. 2 is a flowchart illustrating the operation of the CPU in the write operation.

When the CPU 410 is started in the CPU rewrite mode set by external dip switches or the like, the CPU 410 transfers a data rewrite program in the flash memory 420 to the RAM 480 at step ST201 so that the CPU 410 operates in accordance with the program transferred to the RAM 480. Next, the CPU 410 designates the CPU rewrite mode at step ST202 by writing "1" into a bit in the control register 432, which instructs the CPU rewrite mode. Then, the CPU rewrite mode specifying signal M from the control register 432 is fed to the write/erasing controller 431. This causes the write/erasing controller 431 to wait for a command to be written into the command register 433 by the CPU 410 to execute it.

When the CPU 410 writes the write command into the command register 433, the write/erasing controller 431 decodes the command, and identifies that it is the write command into the flash memory 420. Subsequently, the CPU 410 receives data to be written into the flash memory 420 from the personal computer 500 through the interface circuit 600, and transfers to the flash memory 420 the data to be written therein at step ST203. The write/erasing controller 431 generates a write pulse WP to write the data into the flash memory 420. The write operation is carried out when the write pulse WP is "1" which is turned off to "0" when the write operation has been completed. Data erasure can also be implemented by generating similar pulses.

When the CPU rewrite mode specifying signal M in the control register 432 is turned on to "1", the switching circuit 495 is switched to pass the signal applied to the input port b so that the write completion signal WC is input to the interrupt controller 470.

Figure 3:
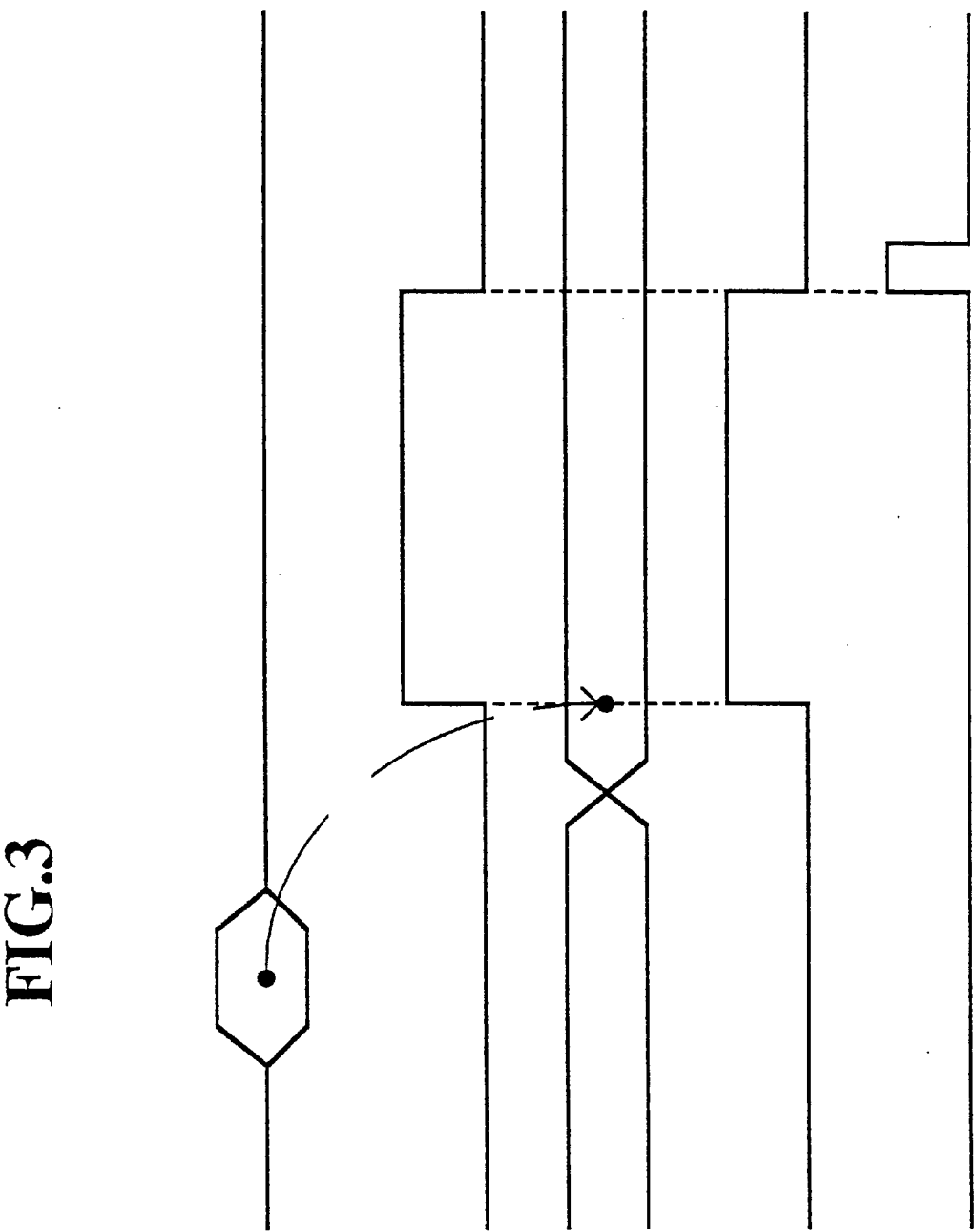
FIG. 3 is a timing chart illustrating timings of various signals of the embodiment 1.

FIG. 3 is a timing chart illustrating timing relationships between the data on the bus 490, the write pulse WP, data latch of the flash memory controller 430, a busy signal BSY, and the write completion signal WC. As illustrated in this figure, the write completion signal WC rises to "1" at the falling edge of the write pulse WP. Thus, the write completion signal WC is sent to the interrupt controller 470 through the switching circuit 495 simultaneously with the write completion, causing an interrupt to the CPU 410 at step ST204. The CPU 410, receiving the interrupt signal, recognized that the data writing to the flash memory 420 has been completed. Since the CPU 410 knows the current mode whether it the CPU rewrite mode or not, it can make a decision whether the interrupt request is one originating from the watchdog timer 450 or the interrupt caused by the completion of writing to the flash memory 420.

The CPU 410, recognizing by the interrupt that the data rewrite to the flash memory 420 has been completed, checks whether or not the data has been written correctly in the flash memory 420 at step ST205. If it is found as a result of the check that the data transfer has some error at step ST206, the CPU 410 retransmits the same data at step ST207. On the contrary, when it is found that the data transmission has been completed correctly at step ST206, and that an intended amount of data has been written at step ST208, the CPU 410 clears the CPU rewrite mode bit in the control register 432 to "0" at step ST209, and completes the operation.

The erasure of the flash memory can also be implemented in a manner similar to the write operation described above by writing "1" into a bit in the control register 432, which indicates the CPU rewrite mode, and then by writing the erasing command in the command register 433.

As described above, since the output of the watchdog timer 450 is disconnected during the CPU rewrite mode in the present embodiment 1, the interrupt to the CPU 410 does not occur due to the overflow of the watchdog timer 450. This can obviate the program for setting the watchdog timer 450, thereby reducing the load of the software. Furthermore, since the write completion signal WC output from the write/erasing controller 431 is supplied to the CPU 410 as an interrupt signal through the switching circuit 495, the CPU 410 can identify the completion of the write operation by the interrupt signal. This can release the CPU 410 from monitoring the busy signal by polling, which enables the CPU 410 to be placed in a waiting or holding mode during the interval corresponding to the monitoring, thereby offering an advantage of saving power.

Embodiment 2

Figure 4:
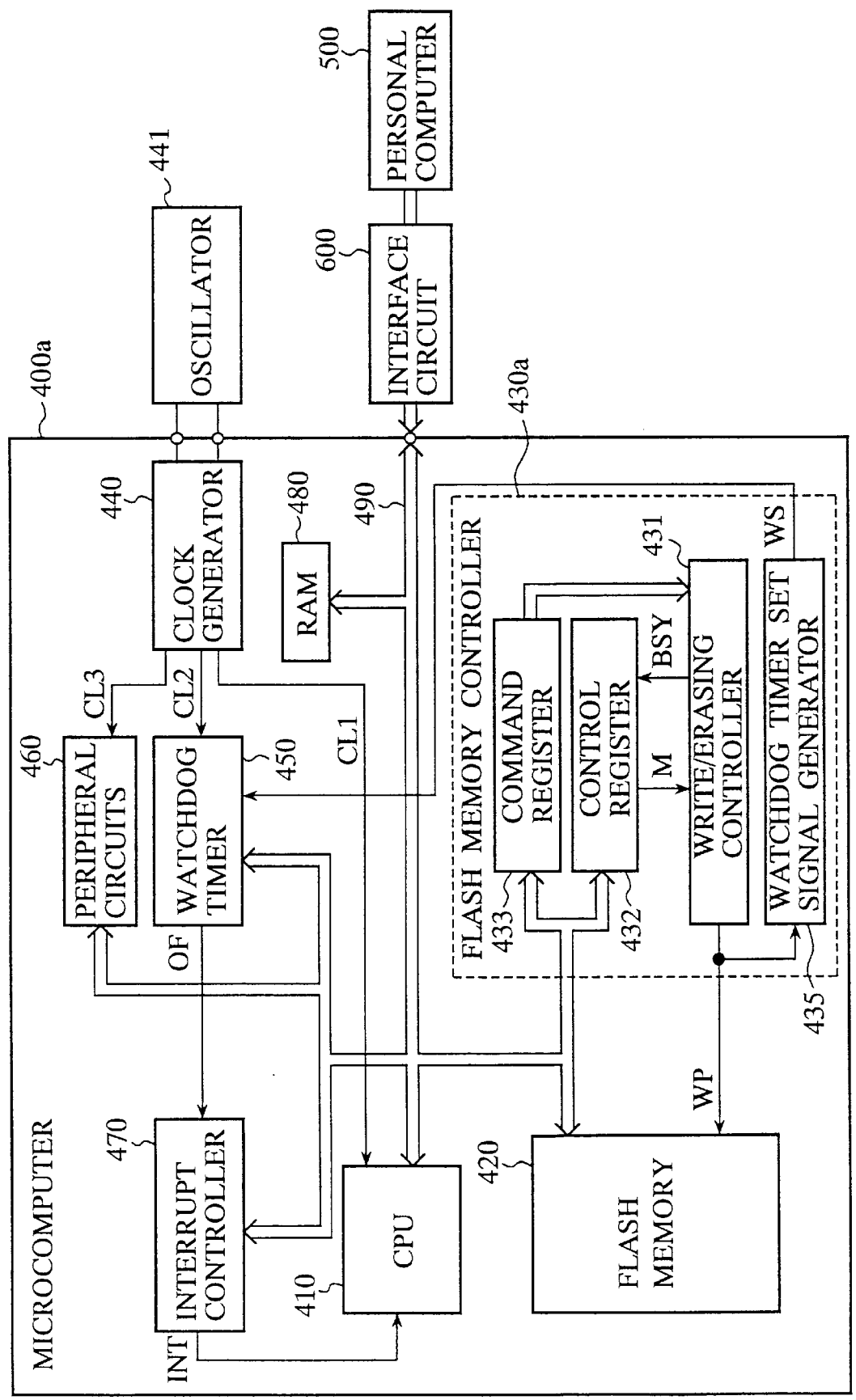
FIG. 4 is a block diagram showing an embodiment 2 of a microcomputer in accordance with the present invention.
Figure 6:
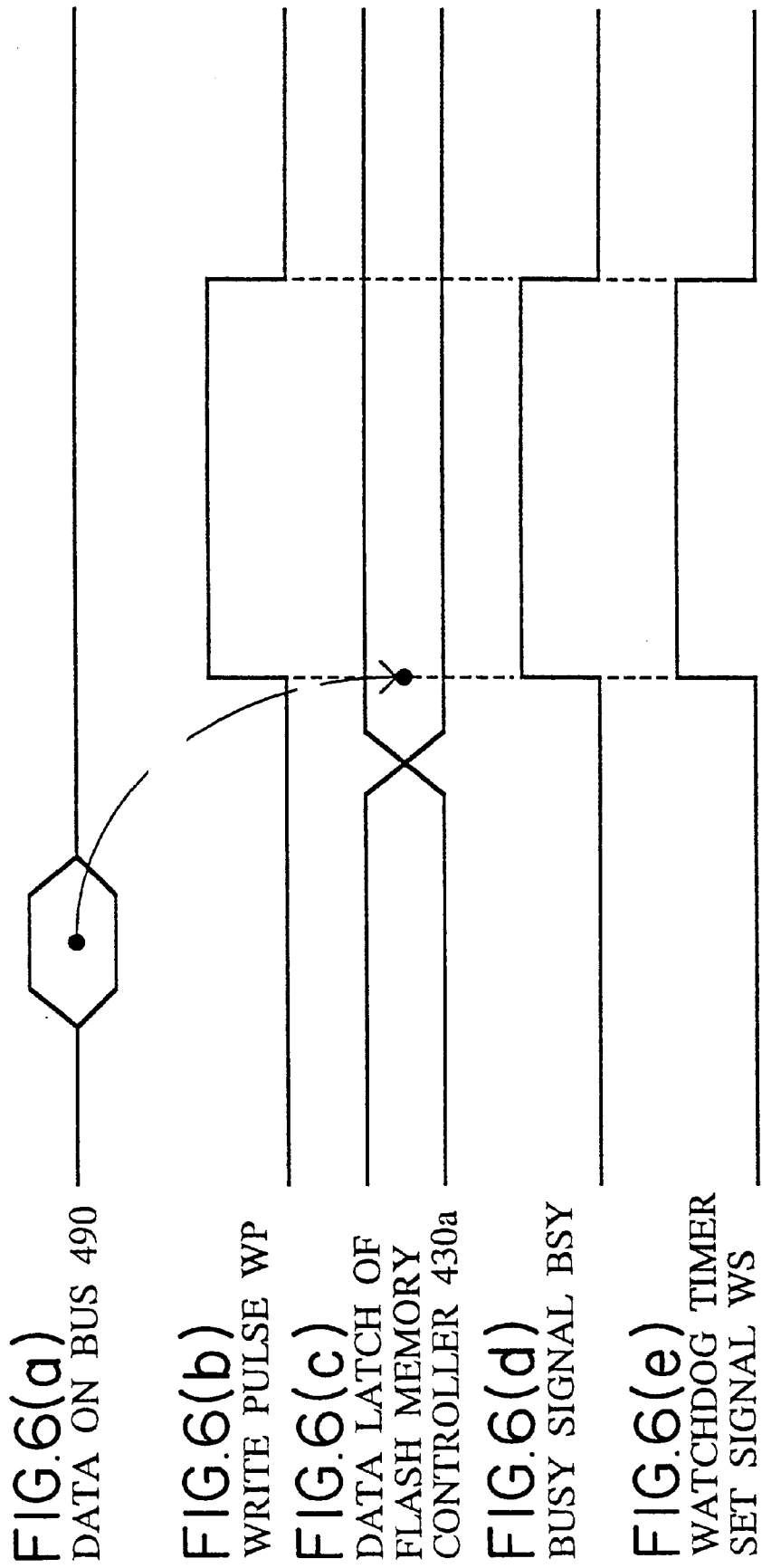
FIG. 6 is a timing chart illustrating timings of various signals of the embodiment 2.

FIG. 4 is a block diagram showing an embodiment 2 of the microcomputer in accordance with the present invention. In this figure, the same portions as those of FIG. 1 are designated by the same reference numerals, and the description thereof is omitted here to avoid duplication. In FIG. 4, the reference numeral 400a designates a microcomputer, 430a designates a flash memory controller, and 435 designates a watchdog timer set signal generator which generates a watchdog timer set signal WS throughout the time while the write pulse WP is "1" as shown in FIG. 6.

Next, the operation will be described.

Figure 5:
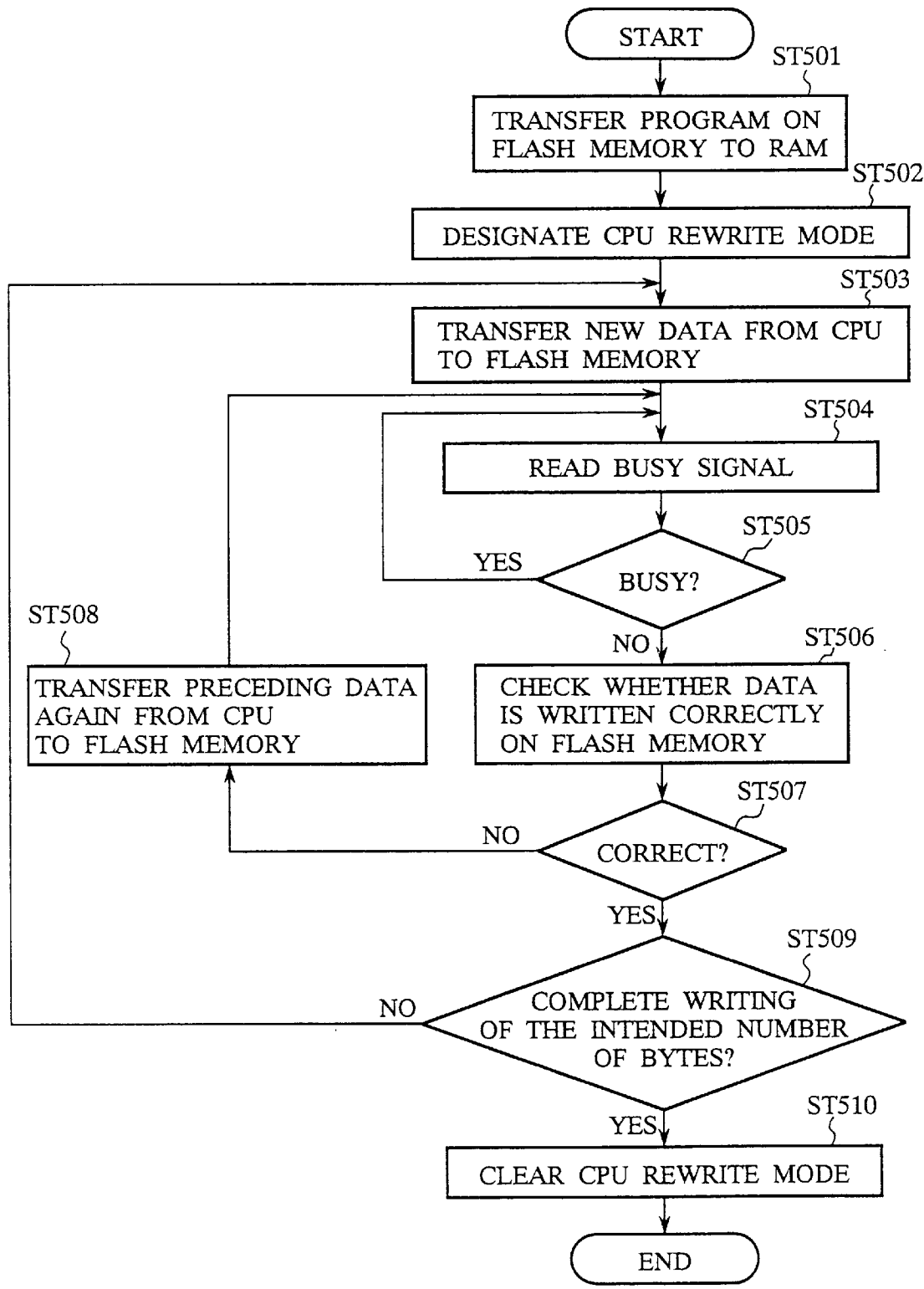
FIG. 5 is a flowchart illustrating the operation of the CPU of the embodiment 2.

Since the basic operation of the microcomputer 400a is the same as that of the embodiment 1 as shown in FIG. 1, we will only describe the write operation of the data which are transferred from the personal computer 500 to the flash memory 420 in the microcomputer 400a. FIG. 5 is a flowchart illustrating the operation of the CPU in the write processing.

Being started in the CPU rewrite mode set by external dip switches or the like, the CPU 410 transfers a data rewrite program from the flash memory 420 to the RAM 480 at step ST501 so that the CPU 410 operates in accordance with the program transferred to the RAM 480. Next, the CPU 410 designates the CPU rewrite mode at step ST502 by writing "1" into a bit in the control register 432, which instructs the CPU rewrite mode. Then, the CPU rewrite mode specifying signal M from the control register 432 is fed to the write/erasing controller 431. This causes the write/erasing controller 431 to wait for a command to be written into the command register 433 by the CPU 410 to execute it.

When the CPU 410 writes the write command into the command register 433, the write/erasing controller 431 decodes the command, and identifies that it is the write command into the flash memory 420. Subsequently, the CPU 410 receives the data to be written into the flash memory 420 from the personal computer 500 through the interface circuit 600, and transfers the data to the flash memory 420 at step ST503. The write/erasing controller 431 generates a write pulse WP to write the data into the flash memory 420. The write operation is carried out while the write pulse WP is "1" which is turned off to "0" when the write operation has been completed. Erasure of data can also be achieved by generating similar pulses.

On the other hand, the watchdog timer set signal generator 435 maintains a watchdog timer set signal WS at "1", which sets the watchdog timer 450 to suspend its counting throughout the period while the write pulse WP is "1". FIG. 6 is a timing chart illustrating timing relationships between the data on the bus 490, the write pulse WP, data latch of the flash memory controller 430a, a busy signal BSY, and the watchdog timer set signal WS. As illustrated in this figure, since the watchdog timer set signal WS is kept "1" while the write pulse WP is "1", the watchdog timer 450 does not advance the count. As a result, no interrupt occurs to the CPU 410.

The CPU 410 reads through the control register 432 the busy signal BSY indicating that the write processing is in progress at step ST504, and when the busy signal falls to "0" at step ST505, it checks at step ST506 whether the data are written correctly into the flash memory 420 or not. If it is found at step ST507 as a result of the check that the data transfer has some error, the CPU 410 retransmits the same data at step ST508. On the contrary, if it is decided at step ST507 that the data transfer has been completed correctly, the CPU 410 checks at step ST509 whether an intended amount of data has been written, clears the CPU rewrite mode bit in the control register 432 to "0" at step ST510, and completes the operation.

Erasing operation of the flash memory can also be implemented in a manner similar to the write operation described above by writing "1" into a bit in the control register 432, which indicates the CPU rewrite mode, and then by writing the erasing command in the command register 433.

As described above, in the present embodiment 2, the watchdog timer 450 suppresses its count while the CPU 410 is writing the external data to the flash memory 420, and restarts its count when the writing has been completed. This can release the software from setting the watchdog timer, thereby reducing the load of the software.

Embodiment 3

Figure 7:
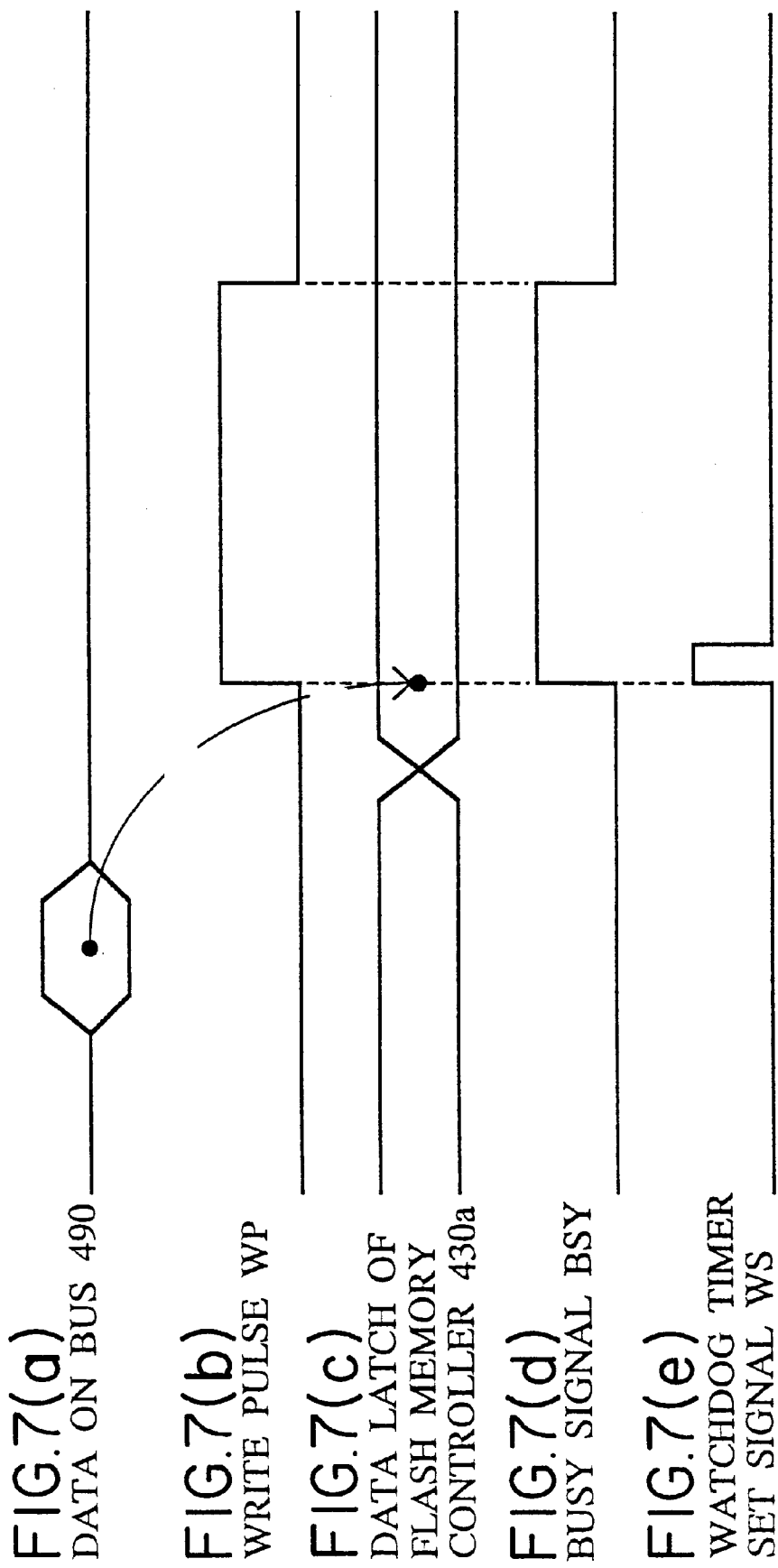
FIG. 7 is a timing chart illustrating timings of various signals of an embodiment 3.
Figure 8:
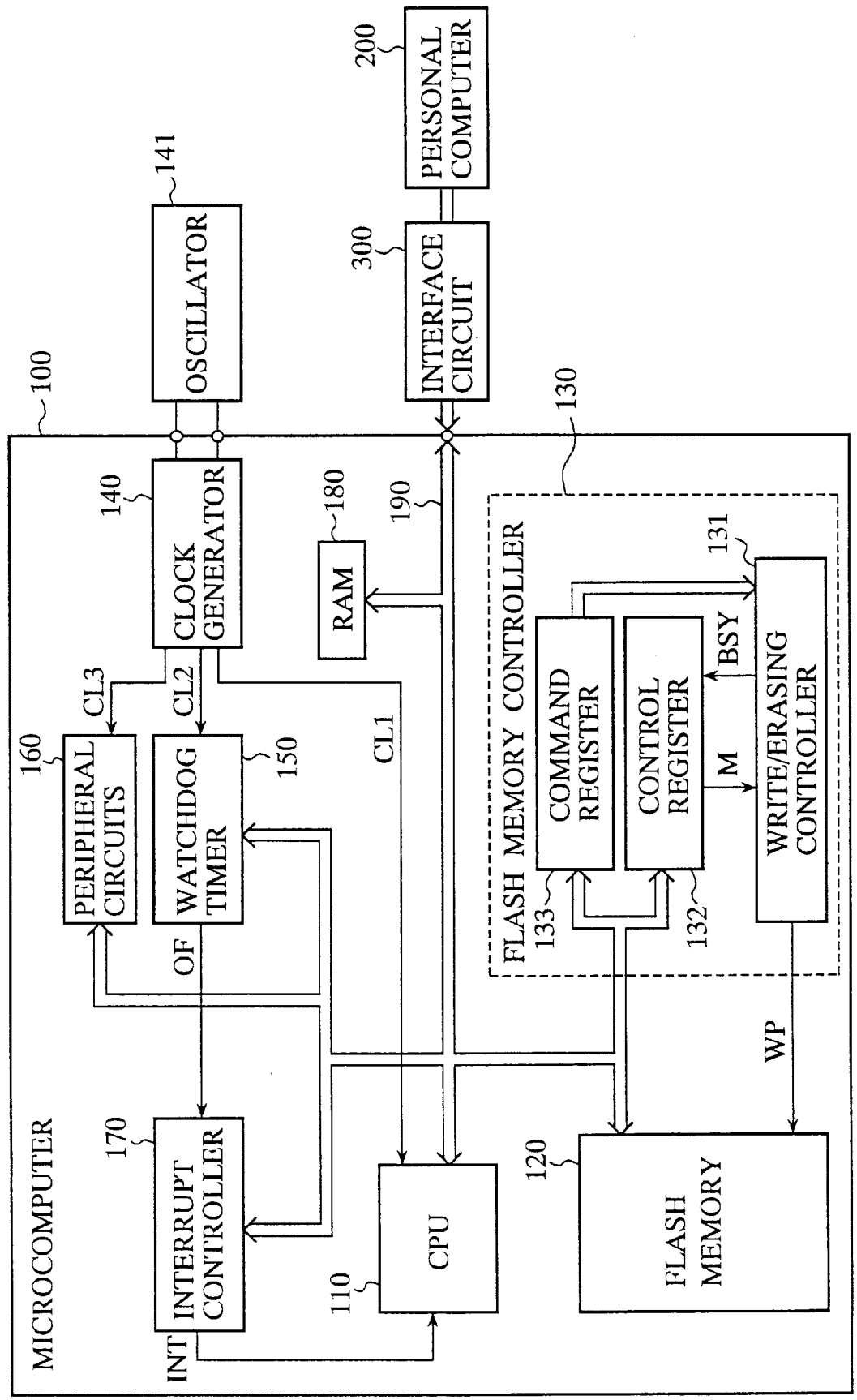
FIG. 8 is a block diagram showing a configuration of a conventional microcomputer.
Figure 9:
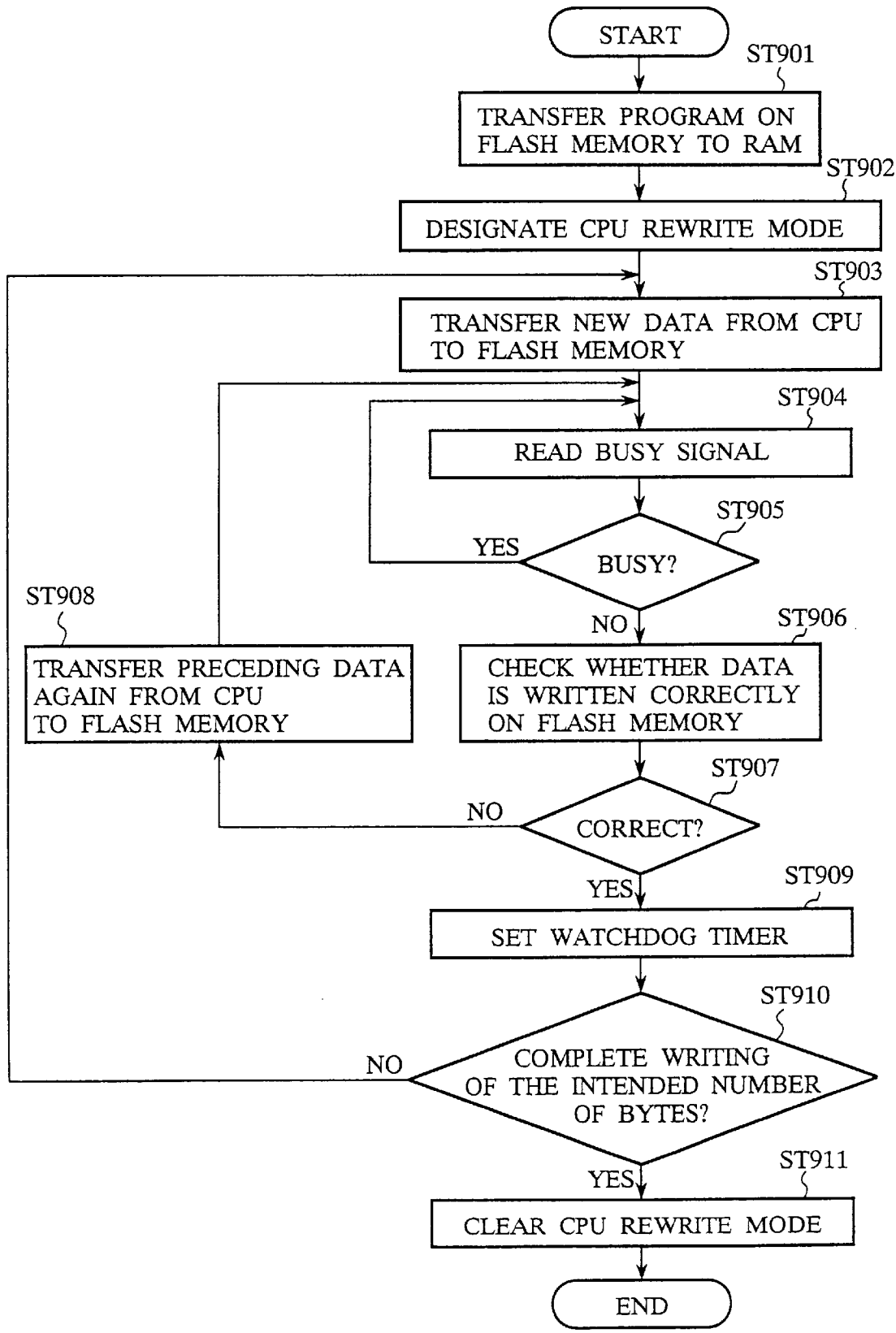
FIG. 9 is a flowchart illustrating the operation of the conventional microcomputer.

An embodiment 3 is the same as the embodiment 2 as described above except for the following points which will be described here without duplication. FIG. 7 is a timing chart illustrating timings of the data on the bus 490, the write pulse WP, the data latch of the flash memory controller 430a, the busy signal BSY, and the watchdog timer set signal WS. In the foregoing embodiment 2 as illustrated in FIG. 6, while the write pulse WP is "1", the watchdog timer set signal WS is kept "1" which is fed from the flash memory controller 430a to the watchdog timer 450. The present embodiment 3, however, is arranged such that the watchdog timer set signal generator 435 in the flash memory controller 430a outputs at the rising edge of the write pulse WP a narrow width one-shot pulse as the watchdog timer set signal WS as shown in FIG. 7.

Next, the operation will be described.

Since the watchdog timer set signal WS is a narrow width pulse, the watchdog timer 450 advances its count at the falling edge of the pulse. Thus, if some error occurs while writing data to the flash memory 420, for example, the CPU 410 can carries out the error processing by the interrupt caused by the overflow of the watchdog timer 450. As a result, the watchdog timer 450 is set every time the flash memory 420 writes data, thereby making it possible for the load of the software to be reduced, and at the same time, for the watchdog timer 450 to detect the error during the write operation.

What is claimed is:

1. A microcomputer including a central processing unit for executing a predetermined program, said microcomputer comprising:

a memory for storing said predetermined program;

a watchdog timer for counting a clock signal, and outputting at least one of an overflow signal and an underflow signal when a predetermined time period has elapsed;

a memory controller for controlling write operation of said memory; and watchdog timer interrupt suppressing means for suppressing an interrupt due to said watchdog timer while a memory data write mode is designated to said microcomputer from an outside, said memory data write mode being a mode in which data is written into said memory, said watchdog timer interrupt suppressing means comprising a switching circuit for supplying said central processing unit with an output signal of said watchdog timer as an interrupt signal except during said memory data write mode, and for inhibiting said overflow signal and said underflow signal of said watchdog timer from being supplied to said central processing unit during said memory data write mode.

2. The microcomputer as claimed in claim 1, wherein said memory controller outputs a write completion signal each time a write processing of said memory has been completed, and said switching circuit supplies said central processing unit with the write completion signal as an interrupt signal during said memory data write mode.

3. The microcomputer as claimed in claim 2, wherein said memory comprises a flash memory, and said memory controller controls writing to said flash memory.

4. The microcomputer as claimed in claim 1, wherein said memory comprises a flash memory, and said memory controller controls writing to said flash memory.

5. A microcomputer including a central processing unit for executing a predetermined program, said microcomputer comprising:

a memory for storing said predetermined program;

a watchdog timer for counting a clock signal, and outputting at least one of an overflow signal and an underflow signal when a predetermined time period has elapsed;

a memory controller for controlling write operation of said memory; and watchdog timer interrupt suppressing means for suppressing an interrupt due to said watchdog timer while a memory data write mode is designated to said microcomputer from an outside, said memory data write mode being a mode in which data is written into said memory, said watchdog timer interrupt suppressing means comprising a watchdog timer set signal generator for supplying said watchdog timer with a watchdog timer set signal which sets said watchdog timer to suspend its counting when the write operation of said memory is started, and which causes said watchdog timer to restart its counting when the write operation has been completed.

6. The microcomputer as claimed in claim 5, wherein said watchdog timer set signal generator supplies said watchdog timer with said watchdog timer set signal which sets said watchdog timer to suspend its counting for a predetermined time period when the write operation of said memory is started, and which causes said watchdog timer to restart its counting after said predetermined time period.

7. The microcomputer as claimed in claim 6, wherein said memory comprises a flash memory, and said memory controller controls writing to said flash memory.

8. The microcomputer as claimed in claim 5, wherein said memory comprises a flash memory, and said memory controller controls writing to said flash memory.

* * * * *